United States Patent  [10] Patent No.: US 6,211,471 B1
Rocke et al.  [45] Date of Patent: Apr. 3, 2001

(54) CONTROL SYSTEM FOR AUTOMATICALLY CONTROLLING A WORK IMPLEMENT OF AN EARTHMOVING MACHINE TO CAPTURE, LIFT AND DUMP MATERIAL

(75) Inventors: David J. Rocke, Eureka; Marvin K. Palmer, Oswego, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/238,272

(22) Filed: Jan. 27, 1999

(51) Int. Cl.[7] .......................... G01G 19/08; G01G 19/10; G01G 19/14; G06F 19/00

(52) U.S. Cl. .......................... 177/136; 177/141; 701/50; 702/174

(58) Field of Search .............................. 701/50; 702/174; 177/136, 137, 141

(56) References Cited

U.S. PATENT DOCUMENTS

| | | |
|---|---|---|
| 3,782,572 | 1/1974 | Gautier ................................... 214/762 |
| 4,919,222 | 4/1990 | Kyrtsos et al. ........................ 177/139 |
| 4,921,578 * | 5/1990 | Shiraishi et al. ................... 177/25.19 |
| 4,995,468 * | 2/1991 | Fukuda ................................. 177/139 |
| 5,065,326 | 11/1991 | Sahm ............................... 364/424.07 |
| 5,067,572 | 11/1991 | Kyrtsos et al. ...................... 177/139 |
| 5,070,953 | 12/1991 | Kyrtsos et al. .................... 177/25.14 |
| 5,105,895 | 4/1992 | Kyrtsos .............................. 177/25.14 |
| 5,182,712 | 1/1993 | Kyrtsos et al. .................. 364/424.07 |
| 5,404,661 | 4/1995 | Sahm et al. .............................. 37/348 |
| 5,438,771 | 8/1995 | Sahm et al. .............................. 37/348 |
| 5,446,980 | 9/1995 | Rocke ..................................... 37/348 |
| 5,461,803 | 10/1995 | Rocke ..................................... 37/443 |
| 5,493,798 | 2/1996 | Rocke et al. ........................... 37/348 |
| 5,528,843 | 6/1996 | Rocke ..................................... 37/348 |
| 5,742,914 * | 4/1998 | Hagenbuch ............................ 701/50 |

* cited by examiner

*Primary Examiner*—Randy W. Gibson
(74) *Attorney, Agent, or Firm*—Kevin M. Kercher; Steven G. Kibby (57) ABSTRACT

A control system including a weight sensing mechanism for sensing weight of the material in a bucket of an earth moving machine and a logic mechanism for receiving the weight signals for the material in the bucket from the weight sensing mechanism and then determining a total summed weight of the material for a total number of capture, lift, and dump cycles needed to capture, lift and dump a predetermined weight of the material with the bucket and then generating various command signals based on the weight signal from each capture, lift and dump cycle and the total summed weight for the total number of capture, lift and dump cycles. In addition, there is a hydraulic implement controller for controlling hydraulic fluid flow to the hydraulic tilt cylinder and the hydraulic lift cylinder in response to the command signals thereby controllably actuating the bucket of the earthmoving machine in order to capture, lift and dump material.

28 Claims, 6 Drawing Sheets

Fig_1_

Fig_2_

Fig. 4

CONTROL SYSTEM FOR AUTOMATICALLY CONTROLLING A WORK IMPLEMENT OF AN EARTHMOVING MACHINE TO CAPTURE, LIFT AND DUMP MATERIAL

TECHNICAL FIELD

This invention relates generally to a control system for automatically controlling a work implement of an earthmoving machine and, more particularly, to a control system that controls the hydraulic cylinders of an earthmoving machine to capture, lift and dump material.

BACKGROUND ART

In general, earthmoving machines such as wheel loaders and the like are used for moving mass quantities of material. These earthmoving machines have work implements that can include a bucket. The bucket is controllably actuated by at least one hydraulic cylinder. The operator typically performs a sequence of distinct operations to capture, lift and dump material.

A typical work cycle can include an operator first positioning the bucket at a pile of material. The bucket is then lowered so that the work implement is near the ground surface. The operator then controls the bucket to raise the work implement through the pile to fill the bucket and lift the material. The operator then tilts or racks the bucket back to capture the material. The operator then moves the earthmoving machine to a desired target location, e.g., dump truck, and dumps the captured material from the bucket. The operator then moves the earthmoving machine back to the pile of material to start this work cycle all over again.

There are numerous problems related to this manual process. With a human operator, the earthmoving machine cannot be constantly productive in all environments and for prolonged work hours. The overloading of a bucket can damage the earthmoving machine or allow material to leave the bucket at undesired locations. On the other hand, the underloading of the bucket can be extremely inefficient and costly. An automated earthmoving machine can work in conditions that are dangerous, unsuitable, or undesirable for human beings. In addition, an automated earthmoving machine can provide more accurate loading that would lessen the problems created by human error as well as a lack of operator skill, experience, or training.

The present invention is directed to overcoming one or more of the problems set forth above.

DISCLOSURE OF THE INVENTION

In one aspect of this invention, a control system for automatically controlling a work implement of an earthmoving machine, the work implement including a bucket, to capture, lift and dump material, the bucket being controllably actuated by a hydraulic tilt cylinder and lift cylinder is disclosed. The control system includes a weight sensing mechanism for sensing weight of the material in the bucket and a logic mechanism for receiving the weight signals for the material in the bucket from the weight sensing mechanism and then determining a total summed weight of the material for a total number of capture, lift, and dump cycles needed to capture, lift and dump a predetermined weight of the material with the bucket and then generating various command signals based on the weight signal from each capture, lift and dump cycle and the total summed weight for the total number of capture, lift and dump cycles. In addition, there is a hydraulic implement controller for controlling hydraulic fluid flow to the hydraulic tilt cylinder and the hydraulic lift cylinder in response to the command signals thereby controllably actuating the bucket of the earthmoving machine in order to capture, lift and dump material.

In another aspect of the present invention, a method for automatically controlling a work implement of an earthmoving machine, the work implement including a bucket, to capture, lift and dump material, the bucket being controllably actuated by a hydraulic tilt cylinder and lift cylinder is disclosed. The method includes the steps of sensing weight of the material in the bucket with a weight sensing mechanism and utilizing a logic mechanism for receiving the weight signals for the material in the bucket from the weight sensing mechanism and summing a total number of capture, lift, and dump cycles needed to capture, lift and dump a predetermined weight of the material and then determining the total summed weight of the material for the total number of capture, lift and dump cycles and then generating various command signals based on the weight signal from each capture, lift and dump cycle and the total summed weight for the total number of capture, lift and dump cycles. In addition, the method includes the step of controlling hydraulic fluid flow to the hydraulic tilt cylinder and the hydraulic lift cylinder with a hydraulic implement controller thereby controllably actuating the bucket of the earthmoving machine in order to capture, lift and dump material.

BRIEF DESCRIPTION OF THE DRAWINGS

For a better understanding of the present invention, reference may be made to the accompanying drawings in which.

BEST MODE FOR CARRYING OUT THE INVENTION

Figure 1:
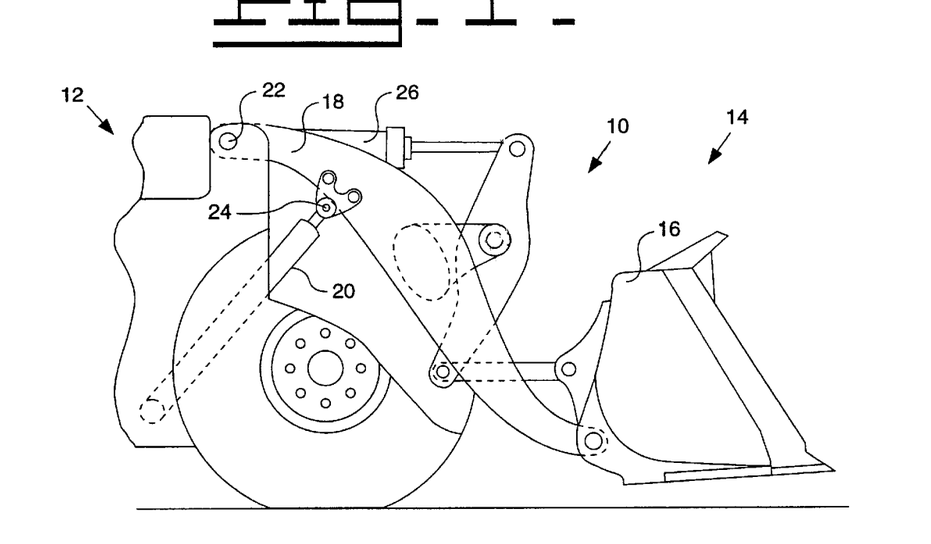
FIG. 1 is a diagrammatic view of a work implement of an earthmoving machine.

Referring now to the drawings, and initially to FIG. 1, an automatic bucket loading system is generally indicated by numeral 10. FIG. 1 only illustrates a forward portion of wheel-type loader machine 12 having a work implement 14, while the present invention is applicable to a wide variety of machines such as track-type loaders and other machines having similar material loading implements. The work implement 14 may include a bucket 16 that is connected to a lift arm assembly 18. However, any of a wide variety of devices for capturing, lifting and dumping material may function as the bucket 16. The lift arm assembly 18 is pivotally actuated by a pair of hydraulic lift cylinders 20 (only one of which is shown) about a pair of lift arm pivot pins 22 (only one of which is shown) that are attached to the frame of the wheel-type loader machine 12. A pair of lift arm load bearing pivot pins 24 (only one of which is shown) are attached to the lift arm assembly 18 and the hydraulic lift cylinders 20. The bucket 16 is also tilted or racked by a hydraulic tilt cylinder 26.

Figure 2:
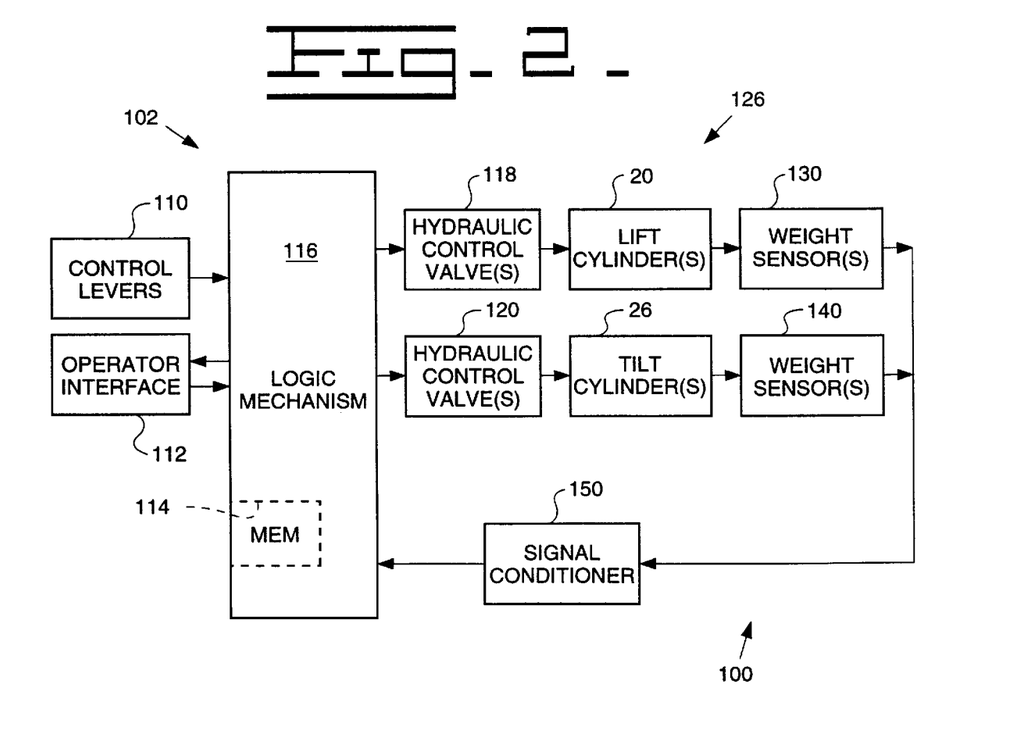
FIG. 2 is a hardware block diagram of various aspects of a control system for an earthmoving machine relating to the present invention.

Referring now to FIG. 2, a block diagram of an electrohydraulic system 100 associated with the present invention is shown. A weight sensing means 126 produces weight signals in response to the weight of the material in the bucket 16 (as shown in FIG. 1). The weight sensing means 126 includes weight sensors 130 and 140 that sense the amount of weight of the material in the bucket 16 from the weight applied to both the hydraulic lift cylinders 20 and a hydraulic tilt cylinder 26, respectively. An example of a position sensor that may be utilized is a radio frequency based sensor described in U.S. Pat. No. 4,737,705 issued to Bitar et al. on Apr. 12, 1988. This is only one aspect of the electrohydraulic system 100, which may include both position and displacement sensors and a variety of associated control algorithms such as that disclosed in U.S. Pat. No. 5,528,843, issued on Jun. 25, 1996 and U.S. Pat. No. 5,682,312, issued on Oct. 28, 1997, among others. There are also a number of payload monitor systems such as that described in U.S. Pat. No. 5,070,953, issued on Dec. 10, 1991 and U.S. Pat. No. 5,067,572, issued Nov. 26, 1991 and U.S. Pat. No. 4,919,222 issued on Apr. 24, 1990.

The weight signals are delivered to a signal conditioner 150. The signal conditioner 150 provides conventional signal excitation and filtering. The conditioned weight signals are delivered to a logic mechanism 116. The logic mechanism 116 can be a microprocessor-based system that utilizes arithmetic units to control processes according to software programs. Typically, the programs are stored in some form of memory 114 such as read-only memory, random-access memory or the like that are typically a component of the logic mechanism 116.

The logic mechanism 116 includes receiving input data from two other sources: multiple joystick control levers 110 and an operator interface 112. The control levers 110 provide for manual control of the work implement 14, as shown in FIG. 1. The output of the control levers 110 determine the work implement 14 movement, direction and velocity.

An operator may enter specifications through an operator interface 112. The operator interface 112 may display information relating to the weight payload of the bucket 16. The operator interface 112 may include a liquid crystal display screen with an alphanumeric key pad. A touch sensitive screen implementation is also suitable. Furthermore, the operator interface 112 may also include a plurality of dials and/or switches for the operator to change the setting for a variety of material conditions.

The logic mechanism 116 produces lift and tilt cylinder command signals for delivery to an actuating means 102 which controllably moves the work implement 14. The actuating means 102 includes hydraulic control valves 118 and 120 that control the hydraulic flow to the respective lift hydraulic cylinders 20 and tilt hydraulic cylinder 26.

The software for automatically controlling a bucket 16 of an earthmoving machine to capture and lift material from a source location, e.g., pile of material, and dump material at a target location, e.g., dump truck, will now be discussed with reference to FIGS. 3A and 3E, which depict flowcharts representative of the computer program instructions executed by the logic mechanism 116 shown in FIG. 2. In the description of the flowcharts, the functional explanation marked with numerals in angle brackets, <nnn>, will refer to the flowchart blocks bearing that number.

Figure 3A:
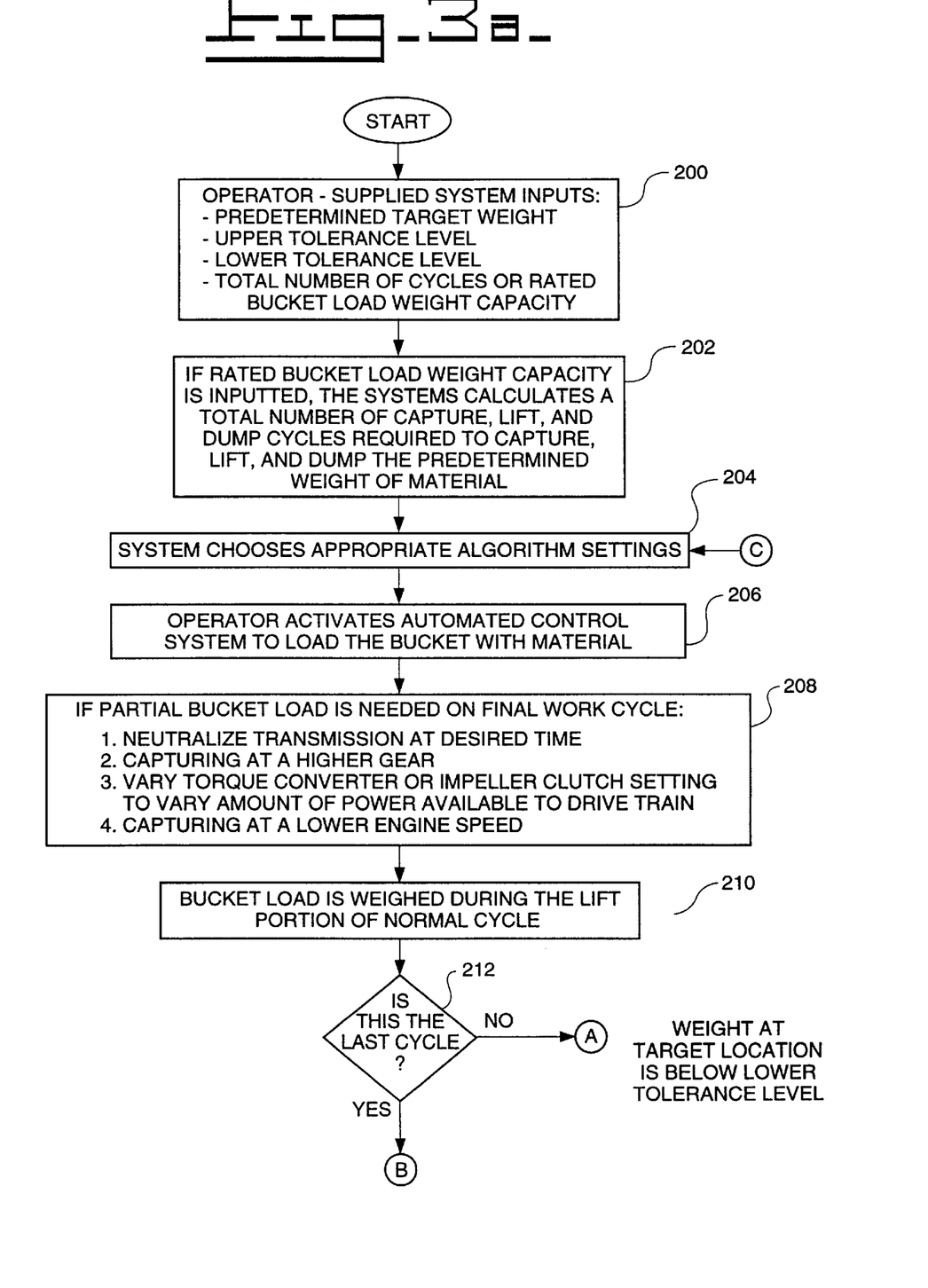
FIGS. 3A and 3B are flowcharts illustrating software for automatically controlling a bucket of an earthmoving machine to capture, lift and dump material from a source location to a target location.
Figure 3B:
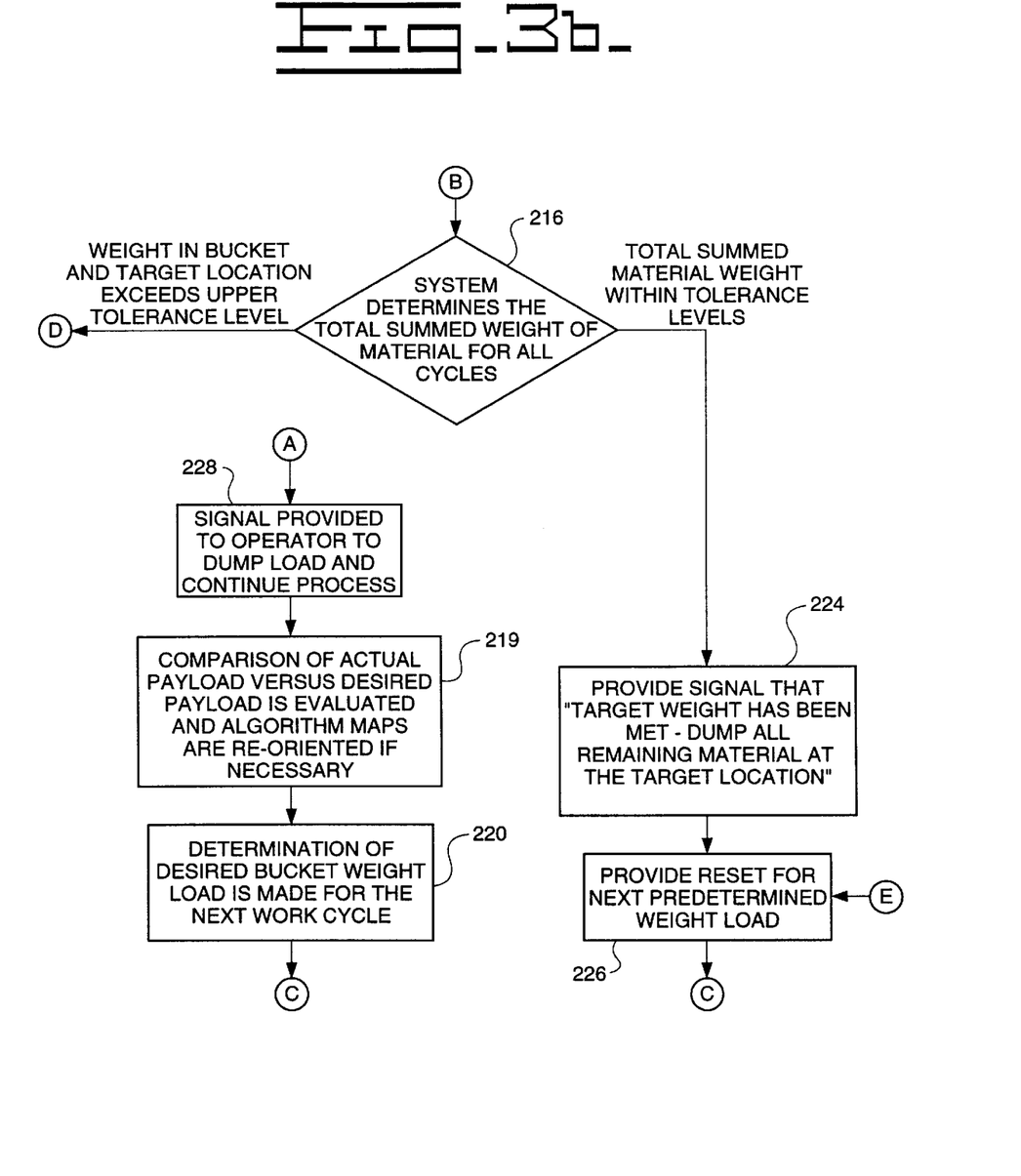

As shown in FIG. 3A, the program first receives operator supplied input data that can include a predetermined weight of material to be captured, lifted and then dumped as well as an upper tolerance level for the predetermined weight of material and a lower tolerance level for the predetermined weight of material. In addition, a total number of capture, lift, and dump cycles can be inputted if the weight load capacity of the bucket 16, as shown in FIG. 1, is not known. <200>. If the rated bucket load weight capacity of the bucket 16 is known, the logic mechanism 116, as shown in FIG. 2, calculates the total number of capture, lift and dump cycles for the bucket 16 to capture, lift and dump the predetermined weight of material <202>. This can be either bucket loads of equal weight or maximum bucket fills, up to the rated bucket load weight, until the last capture, lift and dump cycle.

The next step in the program is for the control system to choose appropriate algorithm settings <204>. The operator then activates the automated control system in order to load the bucket with the material <206>.

The logic mechanism 116 then estimates if a partial bucket load is needed and if the earthmoving machine is on the final capture, lift and dump cycle for the predetermined weight of the material and if a partial bucket load is needed and if a partial bucket load is needed, and if so, a variety of merely illustrative options can be performed by the automatic bucket loading control software <208>. The first option when the logic mechanism expects that enough material has been captured is to neutralize the transmission of the earthmoving machine at a desired time; the second option is to capture material with the bucket 16 at a higher gear; the third option is to vary the torque converter or impeller clutch adjustment to vary the amount of power available to a drivetrain of the earthmoving machine; and the fourth option is to capture material with the bucket 16 at a lower engine speed.

The next step is for the logic mechanism 116 to receive weight signals from the bucket 16 to weigh the material in the bucket 16 during the lift portion of the cycle <210>. A determination is then made to verify whether this is the last capture, lift and dump cycle, i.e., the predetermined weight will not yet be met after dumping all the material from this bucket 16 load onto the target location, required in order to capture, lift and dump the predetermined weight of material with the bucket 16 <212>.

As determined in program step <212>, if it is not the last capture, lift and dump cycle and the weight of the material at the target location is below the lower tolerance level, the logic mechanism 116 will then provide a signal to the operator to dump the material in the bucket 16 at the target location and continue the process <228>, as shown in FIG. 3B. A determination is then made regarding the weight load accuracy of the material in the bucket 16. If the weight of the material that is actually lifted by the bucket 16, as sensed by the weight sensing means 126, as shown in FIG. 2, does not comport with the weight of the material that the logic mechanism 116 expected to capture, lift and dump, then a reorientation of the algorithm maps will occur so that in future cycles the actual weight of material in each bucket 16 will be closer to the amount the control system was wanting to capture <219>. This is a comparison of actual payload versus desired payload. The logic mechanism 116 will then make a determination of the desired bucket 16 load for the next capture, lift and dump cycle <220>. The software program will then return to program step <204>, as shown in FIG. 3A.

When the software program returns to program step <212>, and if this is the last capture, lift and dump cycle, the logic mechanism 116 then determines a total summed weight of the material for a total number of capture, lift, and dump cycles needed to capture, lift and dump a predetermined weight of the material with the bucket 16 <216>, as shown in FIG. 3B. If the total summed weight of the material for the total number of capture, lift and dump cycles is above the lower tolerance level for the predetermined weight of the material and below the upper tolerance level for the predetermined weight of the material then a signal is generated by the logic mechanism 116 for dumping the material in the bucket 16 at the target location <224>. The control system 10 is then reset for the predetermined weight of the material dumped by the bucket 16 at the next target location, e.g., dump truck <226>. The software program will then return to program step <204>, as shown in FIG. 3A.

When the software program returns to program step <212>, and if this is the last capture, lift and dump cycle, the logic mechanism 116 then determines a total summed weight of the material for a total number of capture, lift, and dump cycles needed to capture, lift and dump a predetermined weight of the material with the bucket 16 and if the total summed weight of the material for the total number of capture, lift and dump cycles in addition to the weight of the material in the bucket 16 is above the upper tolerance level or the predetermined weight of the material so that there is excess weight in the bucket 16 then any one of three alternative embodiments of the present invention may be utilized <216>, as shown in FIG. 3B.

Figure 4:
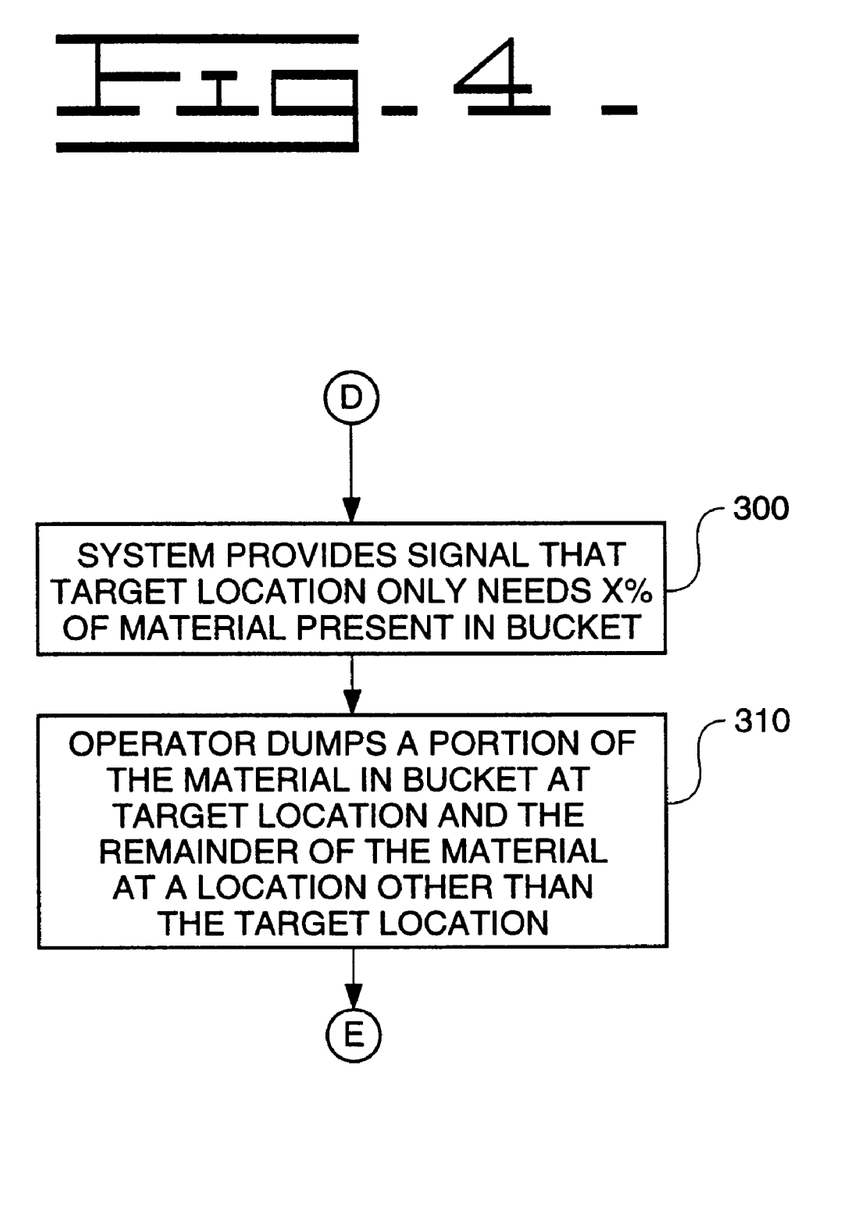
FIG. 4 is a flowchart illustrating, a first embodiment of the present invention, a software program for indicating to an operator that only a certain percentage of the material in the bucket needs to be dumped at the target location.

The first embodiment, as shown in FIG. 4, is when at program step <216>, the logic mechanism 116 provides a determination that the total summed weight of the material for the total number of capture, lift and dump cycles in addition to the weight of the material in the bucket 16 is above the upper tolerance level for the predetermined weight of the material. The logic mechanism 116 then generates a signal that indicates a percentage of the material in bucket 16 that is required to be dumped at the target location <300>. After receiving input data from the operator, the logic mechanism generates command signals operating the hydraulic implement controller in order to dump the percentage of the material in the bucket 16 of the earthmoving machine at the target location and dump any remaining material in the bucket 16 of the earthmoving machine at a location other than the target location <310>. This is typically the source location or originating pile of material. The control system 10 is then reset for the predetermined weight of the material dumped by the bucket 16 at the next target location, e.g., dump truck <226>, as shown in FIG. 3B. The software program will then return to program step <204>, as shown in FIG. 3A.

Figure 5:
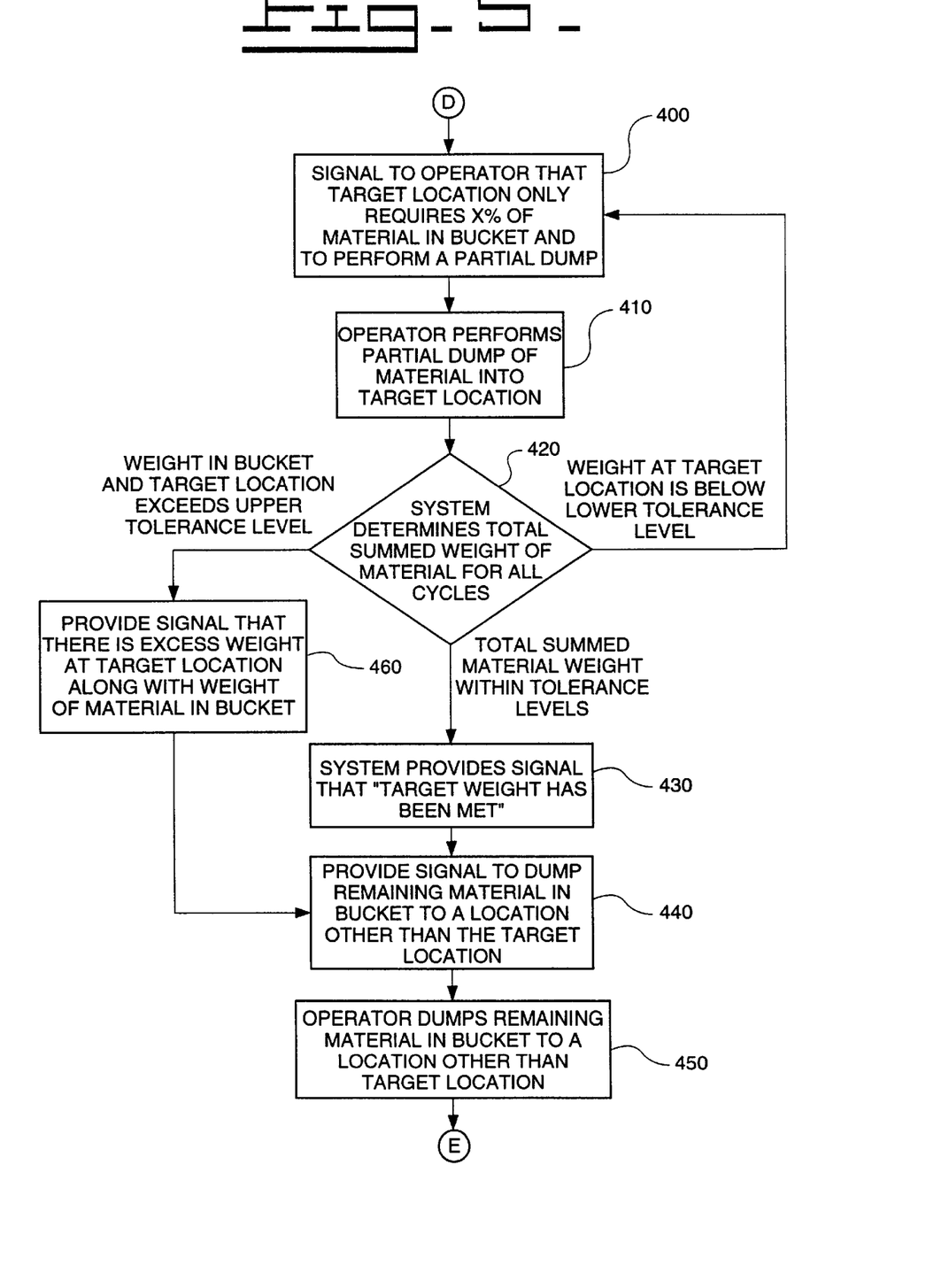
FIG. 5 is a flowchart illustrating, a second embodiment of the present invention, a software program for reweighing the material in the bucket after an operator performs a partial dump, or series of partial dumps, of the material in the bucket at the target location and an indication to dump excess material at a location other than the target location.

The second embodiment, as shown in FIG. 5, is when at program step <216>, as shown in FIG. 3B, the logic mechanism 116 provides a determination that the total summed weight of the material for the total number of capture, lift and dump cycles in addition to the weight of the material in the bucket 16 is above the upper tolerance level for the predetermined weight of the material. The logic mechanism 116 then generates a signal that indicates a percentage of the material in the bucket 16 that is required to be dumped at the target location and that a partial dump at the target location should be performed <400>. After receiving manual operator control signals from the operator, the logic mechanism generates the manual operator control signals operating the hydraulic implement controller in order to partially dump that percentage of the material in the bucket 16, of the earthmoving machine at the target location <410>. It is the operator that is controlling the operation of the machine and not the automatic operation of the logic mechanism 116 throughout this embodiment. The logic mechanism 116, after generating the command signals operating the hydraulic implement controller in order to actuate the bucket 16 and partially dump that percentage of the material in the bucket 16 of the earthmoving machine at the target location, then provides a determination that the total summed weight of the material for the total number of capture, lift and dump cycles is below the lower tolerance level for the predetermined weight of the material <420>. The logic mechanism 116 then generates manual operator control signals operating the hydraulic implement controller in order to create additional partial dumps for the bucket 16 of the earthmoving machine, until the total summed weight of the material for the total number of capture, lift and dump cycles is above the lower tolerance level for the predetermined weight of the material. This is accomplished by having the software program repeat program steps <400>, <410> and <420>, respectively.

Upon returning to program step <420>, the logic mechanism 116, after generating manual operator control signals operating the hydraulic implement controller in order to partially dump the indicated percentage of the material in the bucket 16 at the target location, provides a determination that the total summed weight of the material for the total number of capture, lift and dump cycles is above the lower tolerance level for the predetermined weight of the material and below the upper tolerance level for the predetermined weight of the material. The logic mechanism 116 then generates a signal indicating that the predetermined weight is present at the target location and the target summed weight has been met <430>. The logic mechanism 116 then generates a signal to dump the remaining material in the bucket 16 at a location other than the target location <440>. The logic mechanism 116 also receives manual operator control signals from the control levels 110, as shown in FIG. 2, from the operator and correspondingly generates command signals operating the hydraulic implement controller in order to dump the material in the bucket 16 at a location other than the target location <450>. This location is typically the source location, e.g., pile of material. The control system 10 is then reset for the predetermined weight of the material dumped by the bucket 16 at the next target location, e.g., dump truck <226>, as shown in FIG. 3B. The software program will then return to program step <204>, as shown in FIG. 3A.

When the software program returns to program step <420>, the logic mechanism 116, after generating manual operator control signals operating the hydraulic implement controller in order to partially dump the percentage of the material in the bucket 16 at the target location, provides a determination that the total summed weight of the material for the total number of capture, lift and dump cycles along with the weight of the material in the bucket 16 is above the upper tolerance level for the predetermined weight of the material. The logic mechanism 116 will then generate a signal indicating that the weight of the material at the target location in addition to the weight of the material in the bucket 16 exceeds the upper tolerance level <460>. The logic mechanism 116 then generates a signal to dump the remaining material in the bucket 16 at a location other than the target location <440>. The logic mechanism 116 also receives manual operator control signals from the control levers 110, as shown in FIG. 2, and correspondingly generates command signals operating the hydraulic implement controller in order to dump the material in the bucket 16 at a location other than the target location <450>. This location is typically the source location, e.g., pile of material. The control system 10 is then reset for the predetermined weight of the material dumped by the bucket 16 at the next target location, e.g., dump truck <226>, as shown in FIG. 3B. The software program will then return to program step <204>, as shown in FIG. 3A.

Figure 6:
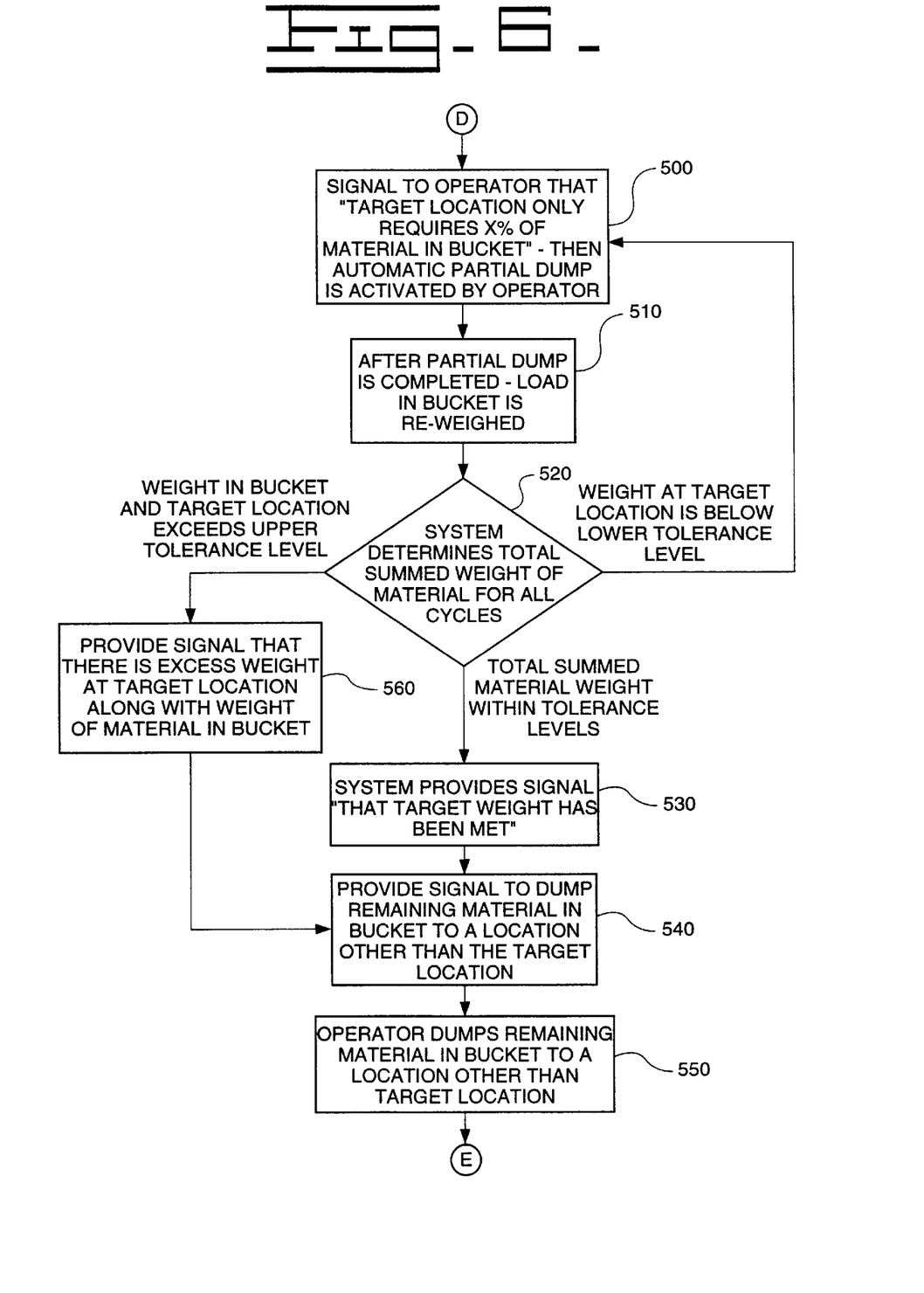
FIG. 6 is a flowchart illustrating, a third embodiment of the present invention, a software program for reweighing the material in the bucket after the earthmoving machine performs an automatic partial dump, or series of automatic partial dumps, of the material in the bucket at the target location and an indication to dump excess material at a location other than the target location.

The third and preferred embodiment, as shown in FIG. 6, is when the software program is at program step <216> as shown on FIG. 3B, the logic mechanism 116 provides a determination that the total summed weight of the material for the total number of capture, lift and dump cycles is above the upper tolerance level for the predetermined weight of the material. The logic mechanism 116 then generates a signal that indicates an automatic partial dump of the percentage of the material in the bucket 16 that is required to be dumped at the target location should be performed and after receiving input data from the operator, the logic mechanism generates command signals operating the hydraulic implement controller in order to automatically partially dump the percentage of the material in the bucket 16 of the earthmoving machine at the target location <500>. After this partial dump is completed, the load in the bucket 16 is reweighed <510>. The logic mechanism 116, then provides a determination that the total summed weight of the material for the total number of capture, lift and dump cycles is below the lower tolerance level for the predetermined weight of the material and generates command signals operating the hydraulic implement controller in order to create additional automatic partial dumps for the bucket 16 of the earthmoving machine until the total summed weight of the material for the total number of capture, lift and dump cycles is above the lower tolerance level for the predetermined weight of the material. This is accomplished by repeating program steps <500>, <510> and <520>, respectively.

At program step <520>, the logic mechanism 116, after generating command signals operating the hydraulic implement controller in order to partially dump that percentage of the material in the bucket 16 of the earthmoving machine at the target location, provides a determination that the total summed weight of the material for the total number of capture, lift and dump cycles is above the lower tolerance level for the predetermined weight of the material and below the upper tolerance level for the predetermined weight of the material. The logic mechanism 116 then generates a signal indicating that the predetermined weight is present at the target location and the target weight has been met <530>. The logic mechanism 116 then generates a signal to dump the remaining material in the bucket 16 at a location other than the target location <540>. The logic mechanism 116 also receives input data from the operator and correspondingly generates command signals operating the hydraulic implement controller in order to dump the material in the bucket 16 of the earthmoving machine at a location other than the target location <550>. The control system 10 is then reset for the predetermined weight of the material dumped by the work implement 14 at the next target location, e.g., dump truck <226>, as shown in FIG. 3B. The software program will then return to program step <204>, as shown in FIG. 3A.

Also, at program step <520>, the logic mechanism 116, after generating command signals operating the hydraulic implement controller in order to partially dump that percentage of the material in the bucket 16 of the earthmoving machine at the target location, provides a determination that the total summed weight of the material for the total number of capture, lift and dump cycles is above the upper tolerance level for the predetermined weight of the material. The logic mechanism 116 then generates a signal indicating that there is an excess above and beyond the predetermined weight present at the target location in addition to the weight of the material in the bucket 16 <560>. The logic mechanism 116 then generates a signal to dump the remaining material in the bucket 16 at a location other than the target location <540>. The logic mechanism 116 also receives input data from the operator and correspondingly generates command signals operating the hydraulic implement controller in order to dump the material in the bucket 16 of the earthmoving machine at a location other than the target location <550>. Typically, this would include the originating or source location, e.g., pile of material. The control system 10 is then reset for the predetermined weight of the material dumped by the work implement 14 at the next target location, e.g., dump truck <226>, as shown in FIG. 3B. The software program will then go to program step <204>, as shown in FIG. 3A.

INDUSTRIAL APPLICABILITY

The present invention is an automatic work implement that is applicable to a wide variety of machines such as track-type loaders and other machines having similar material loading implements. The following description is only for the purposes of illustration and is not intended to limit the present invention as such. It will be recognizable, by those skilled in the art, that the present invention is suitable for a plurality of other applications.

The present invention allows the operator to input a desired weight of material that is to be dumped at a target location with both upper and lower tolerance levels. The earthmoving machine will then be able to automatically perform the desired number of the capture, lift and dump cycles or a calculated number of capture, lift and dump cycles based on weight load capacity of the bucket 16. After the predetermined weight of material is dumped at the target location, the remaining material in the bucket 16 can be disposed of at a location other than the target location. Typically, this would be the originating or source location, e.g., pile of material. If there is an excess in the bucket 16 the percentage required in the bucket 16, the operator will either manually dump the requisite material at the target location with the remaining material dumped at a location other than the target location. A partial dump will be signaled to the operator for the operator to perform a partial dump or series of partial dumps of the requisite material at the target location with the remaining material at a location other than the target location with a reweighing of the material dumped at the target location after each partial dump. In addition, a partial dump or series of partial dumps will automatically be performed in order to dump the requisite material at the target location with the remaining material at a location other than the target location with a reweighing of the material dumped at the target location after each partial dump. If a partial bucket load is needed and if it is the final capture, lift and dump cycle, the earthmoving machine can engage a number of options. Some examples include: neutralizing the transmission of the earthmoving machine at a desired time; allowing the capturing of material with the 14 at a higher gear; varying the torque converter or impeller clutch setting to vary the amount of power available to the drivetrain of the earthmoving machine; and allowing the capturing of material with the work implement 14 at a lower engine speed.

This target payload system provides significant advantages by providing a means of automatically capturing, lifting and than dumping a predetermined weight of material at a target location, e.g. dump truck.

Other aspects, objects and advantages of the present invention can be obtained from a study of the drawings, the disclosure and the appended claims.

What is claimed is:

1. A control system for automatically controlling a work implement of an earthmoving machine, the work implement including a bucket, to capture, lift and dump material, the bucket being controllably actuated by hydraulic cylinders, the system comprising:

a weight sensing mechanism for sensing weight of the material in the bucket;

a logic mechanism for receiving weight signals for the material in the bucket from the weight sensing mechanism and then determining a total summed weight of the material for a total number of capture, lift, and dump cycles needed to capture, lift and dump a predetermined weight of the material with the bucket and generating automated control command signals to capture material based on said summed weight; and a hydraulic implement controller for controlling hydraulic fluid flow to the hydraulic cylinders in response to said command signals thereby controllably actuating the bucket of the earthmoving machine in order to capture, lift and dump material.

2. A control system, as defined in claim 1, wherein the logic mechanism alters the command signals that control the hydraulic implement controller so that varying amounts of the material can be captured and lifted with the bucket depending on the weight signals from the weight sensing mechanism so that the predetermined weight of the material can be captured, lifted, and dumped within the total number of capture, lift, and dump cycles.

3. A control system, as defined in claim 1, wherein the logic mechanism receives input data involving the predetermined weight of the material, weight load capacity of the bucket, and an upper tolerance level for the predetermined weight of the material and a lower tolerance level for the predetermined weight of the material.

4. A control system, as defined in claim 1, wherein the logic mechanism receives input data involving the total number of capture, lift and dump cycles.

5. A control system, as defined in claim 3, wherein the logic mechanism calculates the total number of capture, lift and dump cycles for the bucket to capture, lift, and dump the predetermined weight of the material.

6. A control system, as defined in claim 3, wherein the logic mechanism provides a determination that the total summed weight of the material for the total number of capture, lift and dump cycles is above the lower tolerance level for the predetermined weight of the material and below the upper tolerance level for the predetermined weight of the material and generates a signal for dumping the material in the bucket at a location other than the target location.

7. A control system, as defined in claim 3, wherein the logic mechanism provides a determination that the total summed weight of the material for the total number of capture, lift and dump cycles is below the lower tolerance level for the predetermined weight of the material and generates command signals operating the hydraulic implement controller in order to create an additional capture, lift and dump cycle for the bucket.

8. A control system, as defined in claim 3, wherein the logic mechanism provides a determination that the total summed weight of the material for the total number of capture, lift and dump cycles in addition to the weight of the material in the bucket is above the upper tolerance level for the predetermined weight of the material and generates a signal that indicates a percentage of the material in the bucket that is required to be dumped at the target location and generates command signals operating the hydraulic implement controller in order to dump the percentage of the material in the bucket at the target location and dump any remaining material in the bucket at a location other than the target location.

9. A control system, as defined in claim 3, wherein the logic mechanism provides a determination that the total summed weight of the material for the total number of capture, lift and dump cycles in addition to the weight of the material in the bucket is above the upper tolerance level for the predetermined weight of the material and generates a signal that indicates a percentage of the material in the bucket that is required to be dumped at the target location and receives input data from the operator to perform a partial dump of the bucket and generates command signals operating the hydraulic implement controller in order to partially dump the percentage of the material in the bucket at the target location and dump the remaining material in the bucket at a location other than the target location.

10. A control system, as defined in claim 9, wherein the logic mechanism, after generating command signals operating the hydraulic implement controller in order to partially dump the percentage of the material in the bucket at the target location, provides a determination that the total summed weight of the material for the total number of capture, lift and dump cycles is above the lower tolerance level for the predetermined weight of the material and below the upper tolerance level for the predetermined weight of the material and generates a signal indicating that the predetermined weight is present at the target location and the material in the bucket can be dumped at a location other than the target location and receives input data and correspondingly generates command signals operating the hydraulic implement controller in order to dump the material in the bucket at a location other than the target location.

11. A control system, as defined in claim 9, wherein the logic mechanism, after generating command signals operating the hydraulic implement controller in order to partially dump the percentage of the material in the bucket at the target location, provides a determination that the total summed weight of the material for the total number of capture, lift and dump cycles is above the upper tolerance level for the predetermined weight of the material and generates a signal indicating that the percentage above the predetermined weight that is present at the target location and receives input data and correspondingly generates command signals operating the hydraulic implement controller in order to dump the material in the bucket at a location other than the target location.

12. A control system, as defined in claim 3, wherein the logic mechanism provides a determination that the total summed weight of the material for the total number of capture, lift and dump cycles is above the upper tolerance level for the predetermined weight of the material and generates a signal that indicates a percentage of the material in the bucket that is required to be dumped at the target location and receives input data to perform a partial dump of the bucket and correspondingly generates command signals operating the hydraulic implement controller in order to partially dump the percentage of the material in the bucket at the target location and dump the remaining material in the bucket at a location other than the target location.

13. A control system, as defined in claim 3, wherein the logic mechanism provides a determination that the total summed weight of the material for the total number of capture, lift and dump cycles is above the upper tolerance level for the predetermined weight of the material and generates a signal that indicates a percentage of the material in the bucket that is required to be dumped at the target location and generates command signals operating the hydraulic implement controller in order to partially dump the percentage of the material in the bucket at the target location and dump the remaining material in the bucket at a location other than the target location.

14. A method for automatically controlling a work implement of an earthmoving machine, the work implement including a bucket, to capture, lift and dump material, the bucket being controllably actuated by hydraulic cylinders, the method comprising the steps of:

sensing weight of the material in the bucket with a weight sensing mechanism;

utilizing a logic mechanism for receiving weight signals for the material in the bucket from the weight sensing mechanism and determining a total summed weight for a total number of capture, lift, and dump cycles needed to capture, lift and dump a predetermined weight of the material and automatically generating command signals to capture the material based on a sensed weight signal and the total summed weight for the total number of capture, lift and dump cycles; and controlling hydraulic fluid flow to the hydraulic cylinders with a hydraulic implement controller responsive to said command signals, thereby controllably actuating the bucket of the earthmoving machine in order to capture, lift and dump material.

15. A method, as defined in claim 14, including the step of:

altering the command signals, with the logic mechanism, that control the hydraulic implement controller so that varying amounts of the material can be captured and lifted with the bucket depending on the weight signals from the weight sensing mechanism so that the predetermined weight of the material can be captured, lifted, and dumped within the total number of capture, lift, and dump cycles.

16. A method, as defined in claim 14, including the step of:

receiving input data, with the logic mechanism, involving the predetermined weight of the material, bucket weight load capacity, and an upper tolerance level for the predetermined weight of the material and a lower tolerance level for the predetermined weight of the material.

17. A method, as defined in claim 14, including the step of:

receiving input data, with the logic mechanism, involving the total number of capture, lift and dump cycles.

18. A method, as defined in claim 16, including the step of:

calculating, with the logic mechanism, the total number of capture, lift and dump cycles for the bucket to capture, lift, and dump the predetermined weight of the material.

19. A method, as defined in claim 16, including the steps of:

providing a determination, with the logic mechanism, that the total summed weight of the material for the total number of capture, lift and dump cycles is above the lower tolerance level for the predetermined weight of the material and below the upper tolerance level for the predetermined weight of the material; and generating a signal for dumping the material in the bucket at a location other than the target location.

20. A method, as defined in claim 16, including the steps of:

providing a determination, with the logic mechanism, that the total summed weight of the material for the total number of capture, lift and dump cycles is below the lower tolerance level for the predetermined weight of the material; and generating command signals operating the hydraulic implement controller in order to create an additional capture, lift and dump cycle for the bucket.

21. A method, as defined in claim 16, including the steps of:

providing a determination, with the logic mechanism, that the total summed weight of the material for the total number of capture, lift and dump cycles is above the upper tolerance level for the predetermined weight of the material;

generating a signal that indicates a percentage of the material in the bucket that is required to be dumped at the target location; and generating command signals operating the hydraulic implement controller in order to dump the percentage of the material in the bucket at the target location and dump the remaining material in the bucket at a location other than the target location.

22. A method, as defined in claim 16, including the steps of:

providing a determination, with the logic mechanism, that the total summed weight of the material for the total number of capture, lift and dump cycles is above the upper tolerance level for the predetermined weight of the material;

generating a signal that indicates a percentage of the material in the bucket that is required to be dumped at the target location;

receiving input data from the operator to perform a partial dump of the bucket; and generating command signals operating the hydraulic implement controller in order to partially dump the percentage of the material in the bucket at the target location and dump the remaining material in the bucket at a location other than the target location.

23. A method, as defined in claim 22, after the step of generating command signals operating the hydraulic implement controller in order to partially dump the percentage of the material in the bucket at the target location further includes the steps of:

providing a determination, with the logic mechanism, that the total summed weight of the material for the total number of capture, lift and dump cycles is above the lower tolerance level for the predetermined weight of the material and below the upper tolerance level for the predetermined weight of the material;

generating a signal indicating that the predetermined weight is present at the target location and the material in the bucket can be dumped at a location other than the target location; and generating command signals operating the hydraulic implement controller in order to dump the material in the bucket at a location other than the target location.

24. A method, as defined in claim 22, after the step of generating command signals operating the hydraulic implement controller in order to partially dump the percentage of the material in the bucket at the target location further includes the steps of:

providing a determination, with the logic mechanism, that the total summed weight of the material for the total number of capture, lift and dump cycles is above the upper tolerance level for the predetermined weight of the material;

generating a signal indicating that a percentage above the predetermined weight that is present at the target location;

receiving input data; and generating corresponding command signals operating the hydraulic implement controller in order to dump the material in the bucket at a location other than the target location.

25. A method, as defined in claim 16, including the steps of:

providing a determination, with the logic mechanism, that the total summed weight of the material for the total number of capture, lift and dump cycles is above the upper tolerance level for the predetermined weight of the material;

generating a signal that indicates a percentage of the material in the bucket that is required to be dumped at the target location;

receiving input data to perform a partial dump of the bucket; and generating corresponding command signals operating the hydraulic implement controller in order to partially dump the percentage of the material in the bucket at the target location and dump the remaining material in the bucket at a location other than the target location.

26. A method, as defined in claim 16, including the steps of:

providing a determination, with the logic mechanism, that the total summed weight of the material for the total number of capture, lift and dump cycles is above the upper tolerance level for the predetermined weight of the material;

generating a signal that indicates a percentage of the material in the bucket that is required to be dumped at the target location; and generating command signals operating the hydraulic implement controller in order to partially dump the percentage of the material in the bucket at the target location and dump the remaining material in the bucket at a location other than the target location.

27. The control system of claim 1, further including said logic mechanism automatically controlling at least one of the engine speed and drive train operation to capture a partial bucket of material based upon said summed weight.

28. The method of claim 14, further including the step of said logic mechanism automatically controlling at least one of the engine speed and drive train operation to capture a partial bucket of material based upon said summed weight.

* * * * *